(12) United States Patent
Kaler

(10) Patent No.: US 7,562,151 B2
(45) Date of Patent: Jul. 14, 2009

(54) PEER TUNNELS AND PEER GROUP TARGETS

(75) Inventor: Christopher G. Kaler, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 609 days.

(21) Appl. No.: 11/290,960

(22) Filed: Nov. 30, 2005

(65) Prior Publication Data

US 2007/0121671 A1 May 31, 2007

(51) Int. Cl.
*G06F 15/16* (2006.01)
*G06F 15/173* (2006.01)
*H04L 12/28* (2006.01)
*H04J 3/16* (2006.01)

(52) U.S. Cl. .................... 709/230; 709/236; 709/238; 709/246; 370/390; 370/466

(58) Field of Classification Search .............. 370/395.5, 370/464–467, 469, 473, 474, 476, 389, 390, 370/395.1; 709/230, 231, 236, 238, 246
See application file for complete search history.

(56) References Cited

U.S. PATENT DOCUMENTS

| 6,154,743 | A | 11/2000 | Leung et al. | |
|---|---|---|---|---|
| 6,269,099 | B1 | 7/2001 | Borella et al. | |
| 6,636,509 | B1* | 10/2003 | Hughes | 370/389 |
| 6,751,216 | B2 | 6/2004 | Johnson et al. | |
| 6,954,790 | B2* | 10/2005 | Forslow | 709/227 |
| 7,457,288 | B2* | 11/2008 | Park et al. | 370/390 |
| 7,493,363 | B2* | 2/2009 | Huitema et al. | 709/204 |
| 2002/0156875 | A1* | 10/2002 | Pabla | 709/220 |
| 2003/0002521 | A1* | 1/2003 | Traversat et al. | 370/465 |
| 2003/0050959 | A1* | 3/2003 | Faybishenko et al. | 709/202 |
| 2003/0067912 | A1* | 4/2003 | Mead et al. | 370/389 |
| 2003/0088571 | A1 | 5/2003 | Ekkel | |

(Continued)

FOREIGN PATENT DOCUMENTS

EP 1427148 A1 6/2004

(Continued)

OTHER PUBLICATIONS

Michael Steiner, Gene Tsudki, member, IEE Computer Society, and Michael Waidner, Member, IEEE Computer Society "Key Agreement in Dynamic Peer Groups", pp. 769-780 IEEE Transactions on Parallel and Distributed Systems, vol. 11, No. 8, Aug. 2000 http://doi.ieeecomputersociety.org/10.1109/71.877936.

(Continued)

*Primary Examiner*—Seema S Rao
*Assistant Examiner*—Xavier Szewai Wong
(74) *Attorney, Agent, or Firm*—Workman Nydegger

(57) ABSTRACT

Transferring data using peer-to-peer protocols. A method may be practiced, for example, at a computer system in a computer network. The computer network may include one or more networked agents formed into a peer group of peers using at least one peer-to-peer connection. The method includes an act of receiving a computer readable message from a peer-to-peer network. The computer readable message is a centric message enveloped in a peer-to-peer message. The centric message is extracted. The centric message is delivered to an agent configured for centric type communications.

18 Claims, 4 Drawing Sheets

U.S. PATENT DOCUMENTS

| | | | |
|---|---|---|---|
| 2004/0006708 | A1 | 1/2004 | Mukherjee et al. |
| 2004/0064511 | A1* | 4/2004 | Abdel-Aziz et al. ......... 709/206 |
| 2004/0133679 | A1 | 7/2004 | Kennis et al. |
| 2004/0148439 | A1 | 7/2004 | Harvey et al. |
| 2005/0251611 | A1 | 11/2005 | Creta et al. |
| 2006/0126659 | A1* | 6/2006 | Baum et al. ................. 370/466 |
| 2006/0212592 | A1* | 9/2006 | Gupta et al. ................ 709/230 |
| 2007/0097885 | A1* | 5/2007 | Traversat et al. ............ 370/254 |
| 2007/0239819 | A1* | 10/2007 | Woods et al. ............... 709/201 |
| 2007/0288647 | A1* | 12/2007 | Humphrey et al. .......... 709/230 |

FOREIGN PATENT DOCUMENTS

| | | |
|---|---|---|
| GB | 2416266 A | 1/2006 |

OTHER PUBLICATIONS

Wolfgang Nejdl, Boris Wolf, Changtao Qu, Stefan Decker, Michael Sintek, Ambjörn Naeve, Mikael Nilsson, Matthias Palmér, Tore Risch "EDUTELLA: A P2P Networking Intrstructure Based on RDF", pp. 604-615 May 7-11, 2002 http://delivery.acm.org/10.1145/520000/511525/pg04-nejdl.pdf?key1=511525&key2=1360050411&coll=GUIDE&dI=GUIDE&CFID=65532737&CFTOKEN=14499260.

Vaidy Sunderam, James Pascoe and Roger Loader Department of Math and Computer Science Emory University, Atlanta, GA 30322 USA "Towards a Framework for Collaborative Peer Groups", pp. 1-6 2003 IEEE http://ieeexplore.ieee.org/ie15/8544/27003/01199397.pdf?isNumber=.

Seth Bowen and Frank Maurer "Designing a Distributed Software Development Support System Using a Peer-to-Peer Architecture", 6 pgs. http://ebe.cpsc.ucalgary.ca/ebe/attach?page=Root.publicationList%2FBowenMaure42002b.pdf.

* cited by examiner

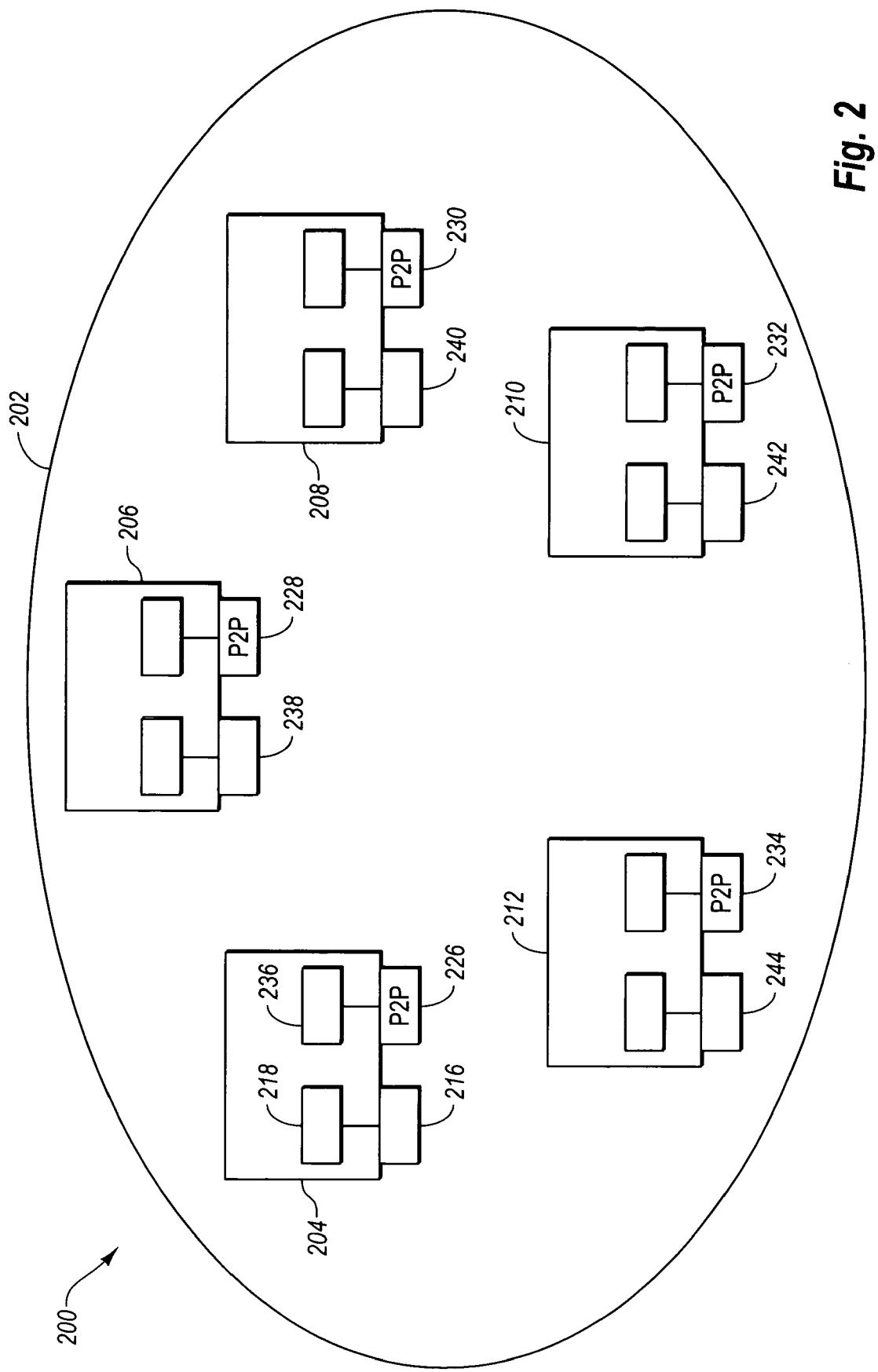

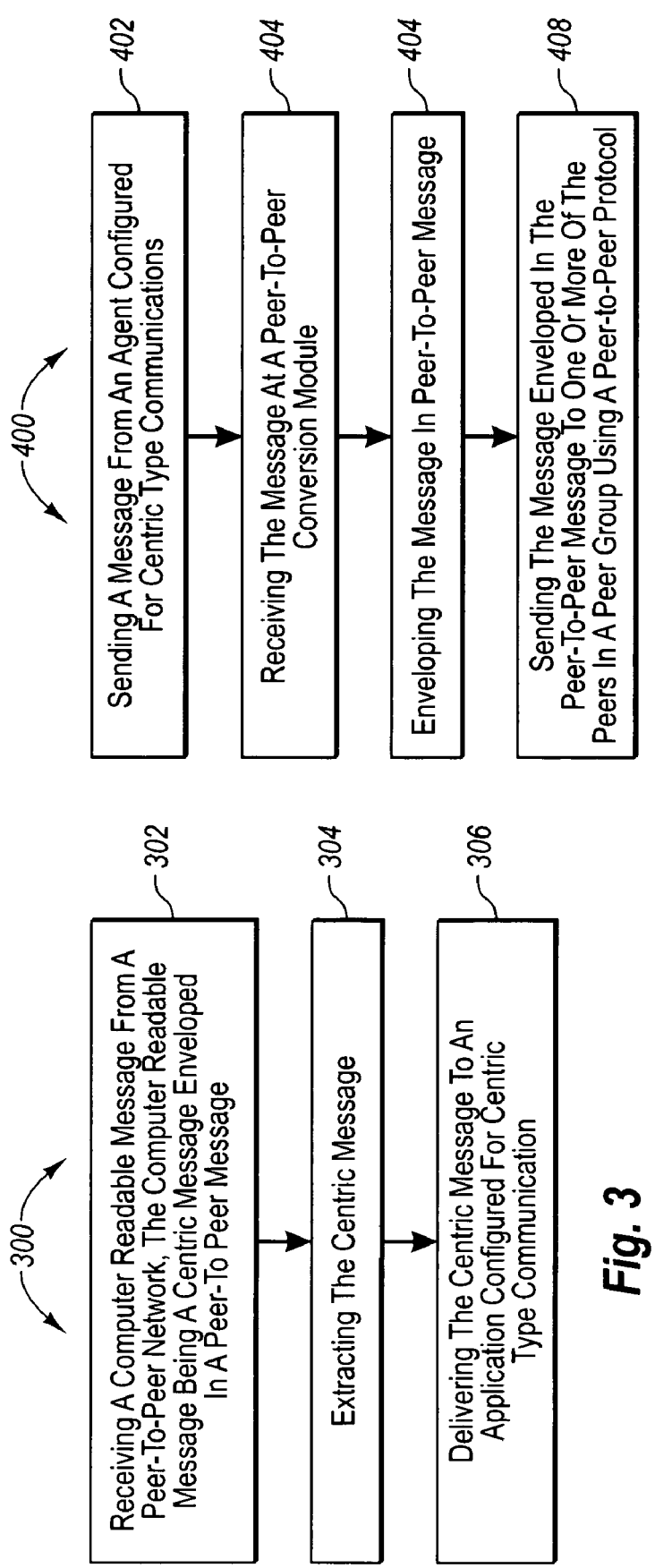

PEER TUNNELS AND PEER GROUP TARGETS

BACKGROUND

Background and Relevant Art

Modern computers often include functionality for connecting to other computers. For example, a modern home computer may include a modem for dial-up connection to internet service provider servers, email servers, directly to other computers, etc. In addition, nearly all home computers come equipped with a network interface port such as an RJ-45 Ethernet port complying with IEE 802.3 standards. This network port, as well as other connections such as various wireless and hardwired connections can be used to interconnect computers.

Computers can be interconnected in various topologies. For example, one topology is a server/client topology. In a server/client topology, a central authority maintains control over the network organization. The central authority can provide routing functionality by providing network addresses to clients on the network. When the central authority becomes disabled or non-functional, network communications can be hampered or completely disabled. The server/client topology and some other topologies communicate using centric message patterns. Examples of centric message patterns include server/client messages, Remote Procedure Call (RPC) messages, and request/multiple response messages.

Another topology is a peer-to-peer topology. In a peer-to-peer topology, peers on a network use peer-to-peer protocols to become aware of one another and to send messages to one another. In a peer-to-peer network, no central authority is necessary to define the network organization. Rather peer-to-peer networks are formed as a self selected group assembled for a purpose. Rather than requiring a central authority to identify network members, the peers in a peer-to-peer network can identify network members by providing and examining tokens, sharing a common encryption or key, and the like.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment described herein includes a method of transferring data. The method may be practiced, for example, at a computer system in a computer network. The computer network may include one or more networked agents formed into a peer group of peers using at least one peer-to-peer connection. The method includes an act of receiving a computer readable message from a peer-to-peer network. The computer readable message is a centric message enveloped in a peer-to-peer message. The centric message is extracted. The centric message is delivered to an agent configured for centric type communications.

An alternative method of transferring data is described herein. The method may be practiced at a computer system in a computer network including one or more networked agents formed into a peer group of peers using at least one peer-to-peer connection. The method includes an act of sending a message from an agent configured for centric type communications. The message is received at a peer-to-peer conversion module. The message is enveloped in a peer-to-peer message. The message enveloped in the peer-to-peer message is sent to one or more of the peers in the peer group using a peer-to-peer protocol.

Yet an another alternative method of transferring data is described herein. The method may be practiced at a computer system in a computer network including one or more networked agents formed into a peer group of peers using at least one peer-to-peer connection. The method may include an act of communicating through a peer-to-peer protocol to contact agents in the peer group. Agents in the peer group are discovered through the peer-to-peer protocol. A message is addressed using centric type endpoint addressing to the agents discovered in the peer group. The message is sent using centric protocols to the agents in the peer group.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 2 illustrates an alternate topology including agents which communicate using peer-to-peer communications and centric communications;

FIG. 3 is a flow chart illustrating a method of transferring data;

FIG. 4 is a flow chart illustrating an alternate method of transferring data.

DETAILED DESCRIPTION

One embodiment described herein is directed to allowing agents that typically communicate using centric type communications to communicate with other agents on a network through peer-to-peer networks and protocols. For example, in one embodiment, traditional communications can be tunneled between sever/client endpoints through peer-to-peer protocols. In this example, one or more networked agents, such as host computers, operating systems, frameworks, application code and the like are formed into a peer-to-peer network with membership in a peer group.

Figure 1:
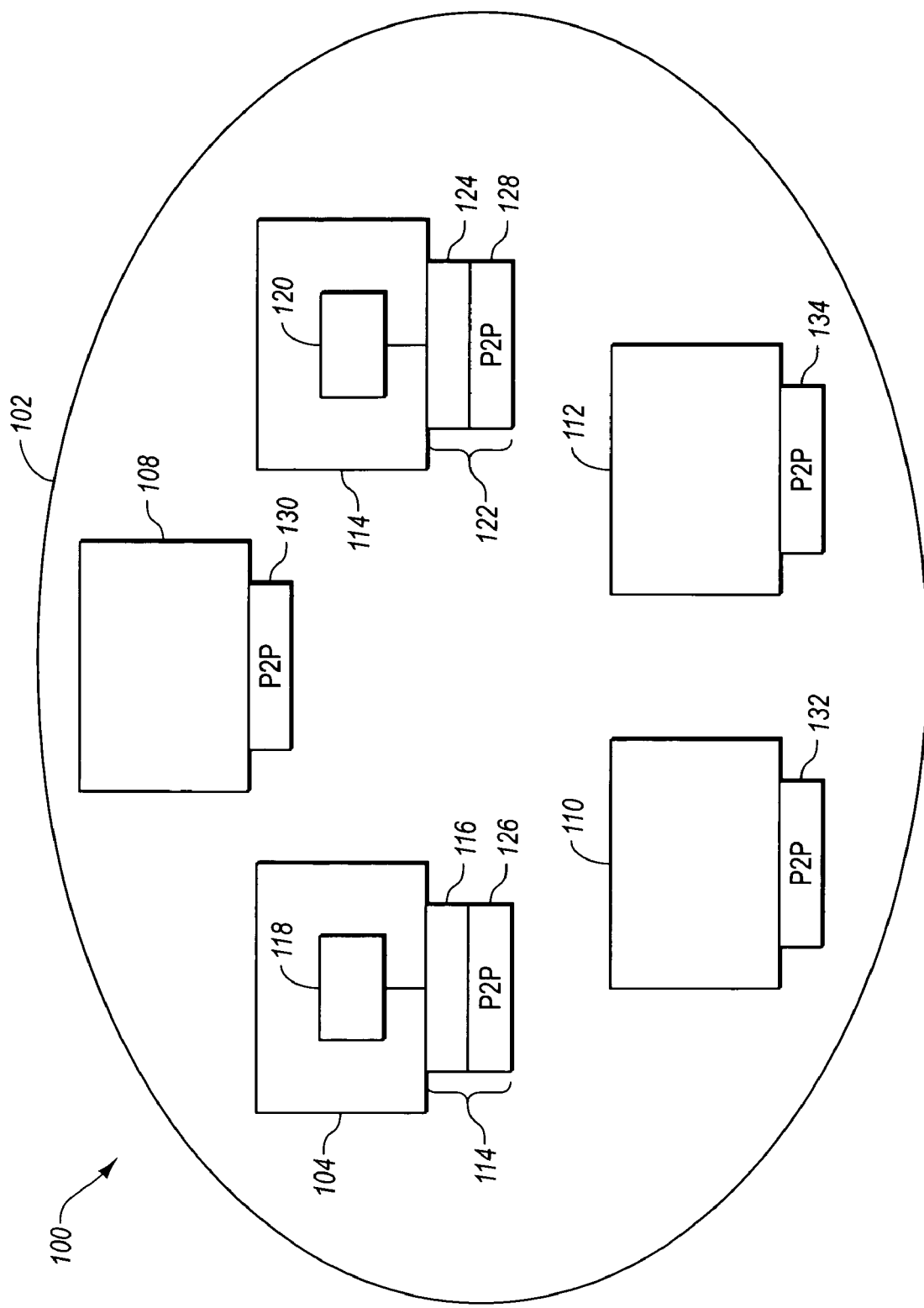
FIG. 1 illustrates a topology including agents which communicate using peer-to-peer communications.

Referring now to FIG. 1, a topology 100 is illustrated. The topology 100 includes a peer group 102 which includes a number of agents 104-112 connected as peers. The agents may include, host computer systems, operating systems, frameworks, applications designed to communicate through centric protocols, and the like. Agent 104 includes a protocol stack 114 which includes a centric protocol 116. The agent 104 may further include an application 118 that uses a centric protocol to communicate. For example, the application may be an email program that uses SMTP (simple mail transport protocol) for sending messages and POP (post office protocol) or IMAP (internet message access protocol) for receiving messages.

Agent 104 may have need to communicate with agent 106. Agent 106, in this embodiment also includes an application 120 that may be configured to communicate using centric protocols. As shown in FIG. 1, the application 120 is connected to a protocol stack 122 which includes a centric protocol 124. In one exemplary embodiment, the application 118 may be a mail client and the application 120 may be a mail server. Other applications may be used as well, and the example discussed here is for illustration purposes only and is not meant to limit the scope of all embodiments.

The applications 118, 120 are designed for communication using centric type protocols. As shown in FIG. 1, the protocol stack 114 connected to the application 118 includes a centric protocol 116 and a peer-to-peer protocol 126. The protocol stack 122 connected to the application 120 in the agent 106 also includes a centric protocol 124 and a peer-to-peer protocol 128. Illustratively, the application 118 sends a message using the centric protocol 116. A module, such as a software module, may be used to convert a message sent to the centric protocol 116 to a peer-to-peer message. The message may then be sent using the peer-to-peer protocol 126 to the agent 106.

Sending a message using a peer-to-peer protocol may be accomplished in several ways. For example one method of communicating using a peer-to-peer protocol involves flooding a message to a peer groups such as the peer group 102 shown in FIG. 1. A peer, such as agent 104, in the peer group 102 may send a message to all of the peers that it is aware of. Each of those peers in turn sends the message to peers that they are aware of. The message continues to be sent within the peer group 102 until it is received by the destination agent, in this example agent 106. At agent 106 the message is received using the peer-to-peer protocol 128. A module may convert the message to a centric message which is delivered to the centric protocol 124. The message is then delivered in the expected centric format to the application 120. In this fashion, applications which are intended for use with centric type protocols may be utilized in a peer-to-peer network by tunneling the centric messages through peer-to-peer protocols.

One embodiment that may use the topology shown in FIG. 1, allows for messages to be communicated to an entire peer group. For example, there may be a desire to communicate a message to a group of agents. One way of grouping the agents is by grouping them in a peer group such as peer group 102. Thus, in one embodiment, a message intended for distribution to an entire group of agents is distributed to an entire peer group that maps to the group for which the message was intended for distribution.

Illustratively, the agent 104 may have a desire to send a message to the other agents 106-112 in the peer group 102 by sending the message to the peer group 102. The message may be one that originates from an application 118 which communicates using a centric protocol 116. The message may be addressed to an alias that conforms to those required by the centric protocol 116, but which is intended to be used to designate all of the agents 104-112 in the peer group 102. A module that converts the message from a centric to peer-to-peer messages may also address the message to all of the agents 104-112 in the peer group 102. The message may be flooded to the peer group 102 through the peer-to-peer protocol 126 so that all agents 104-112 receive the message through peer-to-peer protocols 126-134.

In an alternative embodiment, the peer-to-peer protocol 126 may be designed to send messages received from the application 118 to all of the agents 104-112 irrespective of any addressing information provided by the application 118. In this embodiment, a traditional centric application may be used in combination with a peer-to-peer protocol to distribute messages to a group, where the group is a peer group. Thus for example, a message to a distribution list can be disseminated based on membership in a peer group. In one example, this allows peer groups to be used as distribution lists.

Message sending and receiving may be performed using peer-to-peer protocols such that the use of peer-to-peer protocols is transparent to applications. For example, traditional centric applications can continue to format and send messages using the centric protocols for which they were designed. A protocol stack 114 that includes both centric protocols and peer-to-peer protocols allows the centric messages to be tunneled through the peer-to-peer protocol 126 for delivery to agents 106-110 on a peer group 102. The traditional centric applications function equivalently whether they are used with only a centric protocol or with centric messages tunneled through a peer-to-peer protocol.

An alternative embodiment is illustrated in FIG. 2. FIG. 2 illustrates a topology 200 that includes a peer group 202. The peer group 202 includes a number of agents 204 through 212. As with the example in FIG. 1, an agent 204 may have a desire to send a message for distribution to a distribution group. The distribution group may be embodied as a peer group 202. The message may be a message that is sent from an application 218 that uses a centric protocol 216. In one embodiment, the agent 204 uses an add-in 236 program module that communicates through a peer-to-peer protocol 226 to contact other agents 206-212 in the peer group 202. This can be used to discover what agents are in the peer group 202 through peer-to-peer protocols 226-234. Once the agent 204 has discovered the other agents 206-212 in the peer group, the application 218 can substitute centric type endpoint addressing to the other agents 206-212 discovered in the peer group 202. The message can then be sent using centric protocols 216, 238-244.

Referring now to FIG. 3, a flowchart is shown which shows a method 300 of transferring data. The method 300 includes an act of receiving a computer readable message from a peer-to-peer network, the computer readable message being a centric message enveloped in a peer-to-peer message (302). For example and referring again to FIG. 1, a peer-to-peer message may received at a protocol stack 122 of an agent 106. The peer-to-peer message may be, for example, one that was sent from an agent 104 through a protocol stack 114 that tunnels a centric message through the peer-to-peer protocol 126. Tunneling may include enveloping a centric message in a peer-to-peer message where it is sent from the peer-to-peer protocol 126 of the protocol stack 114 and received at the peer-to-peer protocol 128 of the protocol stack 122.

The centric message, may be for example a message used by a mail client or mail server. For example, the centric message may be one of an SMTP, an IMAP or POP message.

Other centric type applications and messages may also be used within the scope of embodiments described herein.

As explained previously herein, a peer group may be a number of smart peripherals connected to a computer system. In one example, these peripherals may be connected through a peer-to-peer protocol such as Bluetooth. Thus, in one embodiment, the computer readable message may be a Bluetooth message.

The peer-to-peer message may be sent using, for example Web Services. Web Services is a standardized way of integrating applications. Standardized XML documents can be used with SOAP (Simple Object Access Protocol) messages and WSDL (Web Services Description Language) descriptions to integrate applications without an extensive knowledge of the applications being integrated.

The method 300 further illustrates an act of extracting the centric message (302). For example, and referring again to FIG. 1, the computer readable message may be received at the protocol stack 122. The centric message may be extracted by passing the message through the protocol stack 122 including the peer-to-peer protocol 128 and the centric protocol 124.

The method 300 further illustrates an act of delivering the centric message to an agent configured for centric type communications. For example, and referring once again to FIG. 1, a centric message may be delivered from the centric protocol 124 of the protocol stack 122 to the application 120. The application 120 is an application that is configured for centric type communications. This may be for example an email client or email server. Other centric type applications may be used as well. In one embodiment, the computer system may include a peer mail listener. In this example, the peer mail listener receives the computer readable message and extracts the centric message. The centric message may be a mail message which is then delivered to a local mail client. In another embodiment, a peer file server may be used to deliver centric messages to a local peer client.

Referring now to FIG. 4, a flow chart is shown illustrating a method 400 of transferring data. FIG. 4 illustrates an act of sending a message from an agent configured for centric type communications (402). As described previously herein and with reference to FIG. 1, an application 118 on an agent 104 may send a message directed to another agent. In one embodiment, the message may be sent using Web Services.

FIG. 4 further illustrates an act of receiving the message and a peer-to-peer conversion module (404). This conversion module may be for example, a part of the protocol stack 114, or another software module stored at the agent 104.

FIG. 4 further illustrates an act of enveloping the message in a peer-to-peer message (406). Enveloping a message in a peer-to-peer message (406) may be accomplished for example by passing the message through the protocol stack 114 where the message passes through a centric protocol 116 and a peer-to-peer protocol 126.

FIG. 4 further illustrates an act of sending the message enveloped in the peer-to-peer message to one or more of the peers in a peer group using the peer-to-peer protocol (408). Referring again to FIG. 1, the message enveloped in the peer-to-peer message may be sent using the peer-to-peer protocol 126 to other agents 106 through 112 and received at the peer-to-peer protocol 128 through 134 of the other agents 106 through 112. In one embodiment, the message may be sent to the other agents 106 through 112 by flooding the message to the peer group 102. In an alternative embodiment, the protocol stack 114 of the agent 104 includes a peer-to-peer protocol 126 where the peer-to-peer protocol 126 examines the message to determine that the message is addressed to the peer group. Sending the message (408) includes sending the message enveloped in the peer-to-peer message to the peer group 102 based on having determined that the message is addressed to the peer group. In one alternative embodiment, the topology 100 may be designed such that a centric application 118 is used to communicate to all agents in the peer group 102. Thus, a message can be sent such that sending the message (408) includes sending the message enveloped in the peer-to-peer message to the entire peer group 102 irrespective of any addressing done at the application 118 configured for centric type communications.

As with other embodiments described above, the application 118 may be a mail client or mail server. Thus the act of sending a message from the application (402) may include sending a message that is at least one of an SMTP, and IMAP, and a POP message. In a similar vein, the application 118 may be for example a peer mail sender configured to send mail across a peer-to-peer network.

The act of sending the message envelope that in a peer-to-peer message (408) may be transparent to the application 118. In other words, the application 118 is not concerned with how the message is finally sent but rather is concerned with the ability to send a centric messages for which the application 118 was designed.

As described above in conjunction with other embodiments described herein, the peer group 102 may be part of a Bluetooth network where a computer system is connected to a number of peripherals using Bluetooth connections. In this and other embodiments, sending the message enveloped in the peer-to-peer message (408) may include sending a Bluetooth message.

In one embodiment, the peer group 102 may be used as a distribution list. For example the act of sending a message from an application configured for centric type communications (402) may include addressing the message to a distribution list. In one embodiment, the distribution list maps to the peer group 102. In this way, peer groups can be used to define distribution lists. Thus a mail message addressed to a distribution list may be simply flooded to a peer group to which the distribution list corresponds.

Figure 5:
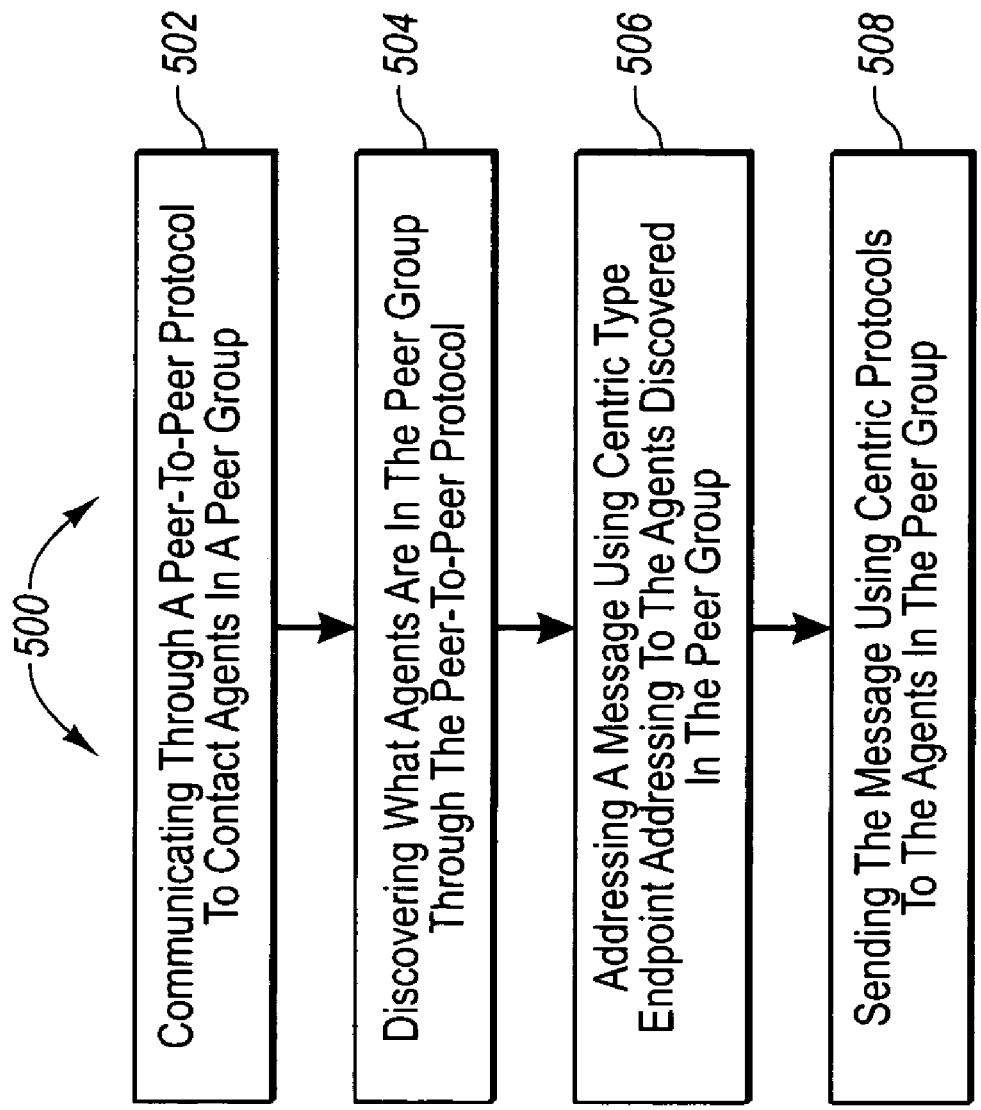
FIG. 5 is a flow chart illustrating yet another method of transferring data.

Referring now to FIG. 5, a flow chart is illustrated showing a method of transferring data 500. The method includes an active communicating through a peer-to-peer protocol to contact agents in a peer group (502). For example and referring to FIG. 2, the agent 204 may desire to discover what peers exist in the peer group 202. Thus the agent 204 communicates through the peer-to-peer protocol 226 to other agents 206 through 212 through peer-to-peer protocols 228 through 234. By communicating through the peer-to-peer protocol to contact agents in the peer group, the method 500 may further include an act of discovering what agents are in the peer group through the peer-to-peer protocol (504). Peer discovery may be accomplished, for example, by finding agents that are in the same trust group. For example, keys, encryption and the like may be used to define a trust group that represent a peer group. Peers in the peer group are those that can communicate using a particular encryption type, that can supply an appropriate authentication token, and the like.

The method 500 further includes an active address in a message using a centric type endpoint addressing to the agents discovered in the peer group. For example, FIG. 2 illustrates that the agent 204 may discover the other agents 206 through 212 by communication through peer-to-peer protocols 226 through 234. Having discovered the other agents 206 through 212, an application 218 configured for centric type communications can address a message to the other agents 206 through 212 using centric type endpoint addressing.

The method 500 further illustrates an act of sending the message using centric protocols to the agents in the peer group. Referring once again to FIG. 2, a message may be sent using the centric protocols 216, 238 through 244 to the other agents 206 through 212. As described previously herein the message may be a mail message which is sent using for example SMTP, IMAP, and POP messages.

Embodiments herein may comprise a special purpose or general-purpose computer including various computer hardware.

Embodiments may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. At a computer system in a computer network including one or more networked agents formed into a peer group of peers using at least one peer-to-peer connection, a method of transferring data, the method comprising acts of:
   receiving a computer readable message from a peer-to-peer network, the computer readable message being a centric message enveloped in a peer-to-peer message, wherein a centric message is defined as a message relying on centralized authority to define network organization and a peer-to-peer message is defined as a message with no central authority defining network organization;
   determining whether the message is intended for the computer system, or a different computer system in the peer group;
   in response to a determination that the message is intended for a different computer system in the peer group, sending the message to a plurality of peers that the computer system is aware of within the peer group;
   in response to a determination that the message is intended for the computer system:
      extracting the centric message contained within the message; and
      delivering the centric message to an agent configured for centric type communications in a centric format expected by the agent, such that the agent communicates with other centric type communication agents over the peer-to-peer network without awareness of the peer-to-peer network over which the centric message was communicated.

2. The method of claim 1, wherein the centric message is at least one of an Simple Message Transfer Protocol (SMTP), an Internet Message Access Protocol (IMAP), a Post Office Protocol (POP), or a Hypertext Transfer Protocol (HTTP).

3. The method of claim 1, wherein the computer readable message is Radio Frequency (RF) message.

4. The method of claim 1, wherein the one or more networked agents comprise smart peripherals connected to the computer system.

5. The method of claim 1, wherein receiving a computer readable message from a peer-to-peer network comprises receiving the computer readable message at a protocol stack that includes a peer-to-peer protocol and a centric protocol, the method further comprising the peer-to-peer protocol examining the computer readable message to determine that it contains a centric message.

6. The method of claim 1, wherein receiving the computer readable message is transparent to the agent configured for centric type communications.

7. The method of claim 1, wherein the computer system comprises a peer file server, the method further comprising delivering the centric message to a local peer client.

8. The method of claim 1, wherein receiving a computer readable message from a peer-to-peer network comprises receiving a Web Services message.

9. At a sending computer system in a computer network including one or more networked agents formed into a peer group of peers using at least one peer-to-peer connection, a method of transferring data, the method comprising acts of:
   sending a centric message from an agent configured for centric type communications, the message having an intended centric recipient, wherein a centric message is defined as a message relying on centralized authority to define network organization;
   receiving the centric message at a peer-to-peer conversion module;
   enveloping the centric message in a peer-to-peer message, wherein a peer-to-peer message is defined as a message with no central authority defining network organization; and
   sending the peer-to-peer message enveloping the centric message to a plurality of peers in the peer group using a peer-to-peer protocol irrespective of whether the plurality of peers includes the intended recipient of the centric message, wherein sending the peer-to-peer message irrespective of whether the plurality of peers includes the intended recipient includes sending the peer-to-peer message enveloping the centric message to a plurality of peers configured to:
   at a recipient computer system within the peer group, receive the peer-to-peer messages enveloping the centric message and determine whether the message is intended the recipient computer system or for a different computer system;

in response to determining that the message is intended for a different computer system, send the message to a plurality of peers also within the peer group; and in response to determining that the message is intended for the recipient computer system, extract the centric message and deliver the centric message to an agent, and in a format expected by the agent, such that the agent communicates with other centric-type communication agents over the peer-to-peer network without awareness of the peer-to-peer network over which the centric message was communicated.

10. The method of claim 9, wherein sending a message from an agent configured for centric type communications comprises sending at least one of a Simple Message Transfer Protocol (SMTP), an Internet Message Access Protocol (IMAP), a Post Office Protocol (POP), or a Hypertext Transfer Protocol (HTTP).

11. The method of claim 9, wherein sending the message enveloped in the peer-to-peer message comprises sending Radio Frequency (RF) protocol message.

12. The method of claim 9, wherein sending the message enveloped in the peer-to-peer message comprises sending a Web Services message.

13. The method of claim 9, wherein sending a message from an agent configured for centric type communications comprises addressing the message to a distribution list, wherein the distribution list maps to the peer group.

14. The method of claim 13, wherein the sending computer system comprises a protocol stack including a peer-to-peer protocol, the method further comprising examining the message at the peer-to-peer protocol to determine that the message is addressed to the peer group, and in response, the act of sending the message enveloped in the peer-to-peer message to one or more of the peers in the peer group using a peer-to-peer protocol comprises sending the message enveloped in the peer-to-peer message to the peer group.

15. The method of claim 9, wherein sending the message enveloped in the peer-to-peer message to one or more of the peers in the peer group using a peer-to-peer protocol comprises sending the message enveloped in the peer-to-peer message to the entire peer group irrespective of any addressing done at that agent configured for centric type communications.

16. The method of claim 9, wherein sending the message enveloped in the peer-to-peer message is transparent to the agent configured for centric type communications.

17. The method of claim 9, wherein the sending computer system comprises a peer file server configured to send messages across a peer-to-peer network.

18. At a computer network comprising a plurality of agents communicatively coupled as peers, each of the agents comprising host computing systems implementing applications designed to communicated through centric protocols, the plurality of agents forming a peer group of peers using at least one peer-to-peer connection, a method of transferring a communication from an email client application at an originating peer to an email server application at a destination peer through the peer to peer network without requiring a centric communication path between the peers, the method comprising acts of:

the email client application sending an email message using a centric protocol, wherein a centric protocol is one that relies on a centralized authority to define network organization and a peer-to-peer protocol is one that has no central authority defining network organization, wherein the email client application is connected to a protocol stack that includes a centric protocol and a peer-to-peer protocol, the email message being sent using the centric protocol and intended for an email server application;

a peer-to-peer conversion module receiving the email message, wherein the peer-to-peer conversion module is located at a location other than a location identified as a destination in the centric message;

the peer-to-peer conversion module enveloping the email message in a peer-to-peer protocol message;

sending the peer-to-peer protocol message enveloping the email message to a plurality of peers in the peer group using the peer-to-peer protocol irrespective of whether the plurality of peers includes the intended recipient of the email message; and at each of the plurality of peers:

receiving the peer-to-peer protocol message enveloping the email message at a protocol stack associated with the peer;

determining whether the peer-to-peer protocol message is intended for an email server application at the peer that received the peer-to-peer protocol message or is instead intended for email server application at a different peer in the peer group; and in response to a determination that the peer-to-peer protocol message is intended for the email server application at a different peer in the peer group, sending the peer-to-peer protocol message to peers of the peer group that peer is aware of;

in response to a determination that the peer-to-peer protocol message is intended for the email server application associated with the peer:

passing the peer-to-peer protocol message through the protocol stack associated with the peer to extract the email message contained within the peer-to-peer message; and delivering the email message to the email server application associated with the peer and configured for centric type communications in a centric format expected by the destination network agent, such that the email client application communicates with the email server application over the peer-to-peer network without awareness of the peer-to-peer network over which the email message was communicated.

* * * * *